United States Patent
Yap et al.

(10) Patent No.: US 12,447,315 B1
(45) Date of Patent: Oct. 21, 2025

(54) ADJUSTABLE MEDICAL DEVICE STABILIZER SYSTEMS AND METHODS OF USE THEREOF

(71) Applicant: AVACEN, Inc., Carlsbad, CA (US)

(72) Inventors: Marc C. Yap, Carlsbad, CA (US); Thomas G. Muehlbauer, Carlsbad, CA (US)

(73) Assignee: AVACEN, Inc., Carlsbad, CA (US)

( * ) Notice: Subject to any disclaimer, the term of this patent is extended or adjusted under 35 U.S.C. 154(b) by 0 days.

(21) Appl. No.: 19/088,834

(22) Filed: Mar. 24, 2025

(51) Int. Cl.
*A61M 25/02* (2006.01)
*B65D 63/10* (2006.01)

(52) U.S. Cl.
CPC ....... *A61M 25/02* (2013.01); *A61M 2025/024* (2013.01); *A61M 2025/026* (2013.01); *A61M 2025/028* (2013.01); *B65D 63/1027* (2013.01); *Y10T 24/3918* (2015.01)

(58) Field of Classification Search
CPC ............ A61M 25/02; A61M 2025/024; A61M 2025/026; A61M 2025/028; B65D 63/1027; Y10T 24/3918
See application file for complete search history.

(56) References Cited

U.S. PATENT DOCUMENTS

| | | | | |
|---|---|---|---|---|
| 268,407 A | * | 12/1882 | Hughes ............... | A61B 17/1327 24/115 H |
| 1,333,102 A | * | 3/1920 | Dietsche ............ | B65D 63/1027 248/351 |
| 3,365,753 A | * | 1/1968 | Prenner ............... | B65D 63/1027 24/16 PB |
| 4,645,492 A | * | 2/1987 | Weeks ................... | A61M 25/02 604/174 |
| 5,352,211 A | * | 10/1994 | Merskelly ............. | A61M 25/02 128/DIG. 26 |

(Continued)

FOREIGN PATENT DOCUMENTS

| | | | | |
|---|---|---|---|---|
| CN | 113181509 A | * | 7/2021 | ............ A61M 25/02 |
| CN | 117298419 A | * | 12/2023 | ............ A61M 25/02 |

(Continued)

OTHER PUBLICATIONS

International Search Report & Written Opinion dated Feb. 10, 2022 in Int'l PCT Patent Appl. Serial No. PCT/US2021/048279.

*Primary Examiner* — Bhisma Mehta
*Assistant Examiner* — Adam J. Cermak
(74) *Attorney, Agent, or Firm* — Greenberg Traurig, LLP; Albert K. Heng; Christopher C. Bolten

(57) ABSTRACT

An adjustable stabilizer is provided for securing a medical device to a patient, relative to the angle and point of insertion. The stabilizer has a bottom surface and first and second top surfaces which meet at an apex of the stabilizer. The angle of the first top surface relative to the bottom surface may be adjusted to correspond with the medical device's insertion angle to permit the medical device entering the patient's body to extend from the insertion site on the patient's body along the first top surface, over the apex, and along the second top surface back towards the patient's body, thereby reducing stress at the insertion site, discomfort for the patient, and the risk of insertion site bleeding, while minimizing risk of damage to the medical device. The stabilizer may transition between a relaxed state and a flexed state to releasably secure the medical device to the stabilizer.

31 Claims, 9 Drawing Sheets

(56) References Cited

U.S. PATENT DOCUMENTS

| | | | |
|---|---|---|---|
| 5,484,420 A | 1/1996 | Russo | |
| 5,578,013 A * | 11/1996 | Bierman | A61M 25/02 604/174 |
| 5,685,859 A * | 11/1997 | Kornerup | A61M 25/02 604/179 |
| 5,690,616 A * | 11/1997 | Mogg | A61M 25/02 604/174 |
| 6,197,004 B1 | 3/2001 | Nicolosi | |
| 6,332,874 B1 | 12/2001 | Eliasen et al. | |
| 6,837,875 B1 * | 1/2005 | Bierman | A61M 25/02 604/174 |
| 7,491,190 B2 * | 2/2009 | Bierman | A61M 25/02 604/174 |
| 7,635,354 B2 * | 12/2009 | Navarro | A61M 25/02 604/174 |
| 9,486,613 B2 | 11/2016 | Dickert et al. | |
| 9,888,736 B1 * | 2/2018 | DeLuca | F16G 11/103 |
| 9,895,514 B2 | 2/2018 | Bierman et al. | |
| 11,628,278 B2 * | 4/2023 | Harders | A61M 25/02 604/174 |
| 2001/0049504 A1 * | 12/2001 | Gautsche | A61B 46/23 604/179 |
| 2004/0034330 A1 * | 2/2004 | Bierman | A61M 25/02 604/500 |
| 2006/0095008 A1 | 5/2006 | Lampropoulos et al. | |
| 2007/0066958 A1 | 3/2007 | Wright | |
| 2008/0200880 A1 * | 8/2008 | Kyvik | A61M 25/02 604/180 |
| 2009/0149814 A1 | 6/2009 | Bailey et al. | |
| 2009/0326474 A1 * | 12/2009 | Bierman | A61M 5/1418 604/180 |
| 2010/0010475 A1 * | 1/2010 | Teirstein | A61M 25/02 604/528 |
| 2012/0130315 A1 | 5/2012 | Weadock et al. | |
| 2014/0148778 A1 | 5/2014 | Levy | |
| 2014/0228810 A1 * | 8/2014 | Rosenberg | A61M 25/02 604/513 |
| 2015/0133891 A1 | 5/2015 | Rosenhan | |
| 2015/0367102 A1 * | 12/2015 | Andino | A61M 25/02 604/179 |
| 2017/0136215 A1 * | 5/2017 | Harders | A61M 25/02 |
| 2017/0340848 A1 * | 11/2017 | Mayar | A61M 16/0488 |
| 2018/0207416 A1 * | 7/2018 | Roddy | A61M 39/24 |
| 2018/0264232 A1 * | 9/2018 | Beran | A61M 25/02 |
| 2021/0146097 A1 | 5/2021 | Xiao et al. | |
| 2021/0244917 A1 * | 8/2021 | Albertsen | B65D 63/1027 |
| 2022/0040455 A1 * | 2/2022 | Wiegel | A61M 25/02 |
| 2022/0062592 A1 * | 3/2022 | Bonaguidi, Jr. | A61M 25/02 |
| 2022/0241559 A1 * | 8/2022 | East | A61M 25/02 |
| 2023/0193663 A1 * | 6/2023 | Lawrence | E05B 75/00 70/15 |
| 2023/0310808 A1 * | 10/2023 | Jansson | A61M 25/02 604/179 |
| 2024/0091503 A1 * | 3/2024 | Kusumoto | A61M 25/02 |

FOREIGN PATENT DOCUMENTS

| | | | | |
|---|---|---|---|---|
| CN | 119423656 A * | 2/2025 | | A61M 25/0113 |
| DE | 202011002781 U1 * | 6/2011 | | A61M 25/02 |
| ES | 2264219 T3 * | 12/2006 | | A61M 25/02 |
| GB | 2606419 A * | 11/2022 | | A61M 25/02 |
| GB | 2609502 A * | 2/2023 | | A61M 25/02 |
| GB | 2620574 A * | 1/2024 | | A61M 25/02 |
| JP | 2008220633 A | 9/2008 | | |
| KR | 20200024574 A * | 3/2020 | | A61M 5/1418 |
| KR | 102540567 B1 * | 6/2023 | | A61M 25/02 |
| KR | 20240124720 A * | 8/2024 | | A61M 25/02 |
| WO | WO-2009043886 A1 * | 4/2009 | | B65D 63/1027 |
| WO | WO-2011015968 A1 * | 2/2011 | | B65D 63/1027 |
| WO | WO-2023021359 A1 * | 2/2023 | | A61M 25/02 |
| WO | WO-2023099891 A1 * | 6/2023 | | B29C 45/2708 |
| WO | WO-2025058800 A1 * | 3/2025 | | A61M 35/006 |

* cited by examiner

ADJUSTABLE MEDICAL DEVICE STABILIZER SYSTEMS AND METHODS OF USE THEREOF

TECHNICAL FIELD

This technology relates generally to devices, systems, and methods for securing medical devices to a patient while minimizing risk of harm to the patient and damage to the medical device.

BACKGROUND

Medical devices, such as catheters, are widely used to access the internal body lumen of a patient. Such devices are commonly used to create direct vascular access for medical device placement, hemodynamic monitoring, pharmaceutical injections, infusion therapies, and a wide and rapidly growing range of interventional procedures. These procedures often require repeated and/or sustained access to the body lumen and may be partially or wholly implanted, e.g., subcutaneously, percutaneously, or transcutaneously, at sites throughout the body e.g., femoral, popliteal, brachial, axial, tibial, and carotid. After access is established, it is critical that the device is secured in specific orientations relative to the insertion site to prevent unintentional motion or displacement. Often, the extracorporeal portion of the catheter, adjacent to the insertion site, is secured to the patient via adhesive tape, sutures, propped up with folded gauze pads, or catheter-specific securement devices. While catheterization is generally safe, major bleeding, hematomas, and vascular complications related to access can occur. Major bleeding complications are further amplified in patients undergoing large-bore access. Despite multiple adjustments in devices and techniques, bleeding and vascular complications continue to be a substantial source of morbidity. Patient transfers and indwelling device management is fraught with vascular complications, device dislodgement, clinical deterioration, and is associated with a statistically significant increase in mortality, length of stay, and cost. Depending on the procedure, a catheter enters the patient at a corresponding angle to secure vascular entry. This extracorporeal portion of the catheter must be secured, and its entry angle maintained to mitigate insertion site stress upon both the catheter and the surrounding tissue, discomfort to the patient, and excessive bleeding.

Without proper support and stabilizing systems readily available to mitigate access site bleeding complications, medical professionals may resort to wedging objects between the catheter and the patient's skin adjacent to the catheter insertion site so that the catheter will enter the patient's body at the appropriate, optimal insertion angle, to prevent, reduce, or stop bleeding. Hemostatic intervention and, in some cases, repositioning and re-procedure can be avoided with a proper catheter stabilizing system.

Moreover, the repeated manipulation and movement of the extracorporeal portion of the catheter causes wear and damage to the catheter, as well as communicates motion to the patient's tissues at the catheter insertion site, thereby causing various complications depending upon the type of catheter used. To stabilize the extracorporeal portion of the catheter, tie-down materials, such as bandaging, folded gauze pads, patches with upstanding anchoring posts, medical adhesive tape, belts, elastic bands, and sutures, are typically used, all of which do not fully mitigate the complications described above with regard to patient discomfort and bleeding.

Devices have been theorized for securing and/or stabilizing a catheter to a patient. For example, U.S. Pat. No. 5,484,420 to Russo describes a retention bolter for a percutaneous catheter which has a convexly curved exterior surface which contacts the epidermal surface of the patient. The retention bolster slides over the catheter until it contacts the patient's skin at the catheter exit site. When secured in place, the retention catheter rocks along contacting portions between its convexly curved surface and the patient's skin in response to movement of the catheter about the exit site, thereby alleviating pressure that would otherwise be applied by the movement. However, the retention bolster described therein does not accommodate varying insertion angles of various catheters and would potentially cause unwanted bending and/or kinking of the catheter.

U.S. Pat. No. 6,332,874 to Eliasen describes a stabilization sleeve having stabilization wings for receiving a catheter to provide axial and bending strain relief to the catheter. The lumen of the stabilization sleeve may be slightly angled; however, the stabilizer sleeve does not accommodate varying insertion angles of various catheters. U.S. Pat. No. 7,635,354 to Navarro describes a device for fixing a catheter to the body of a patient. The device includes a housing which can be closed by a lid, the housing having a first chamber for passing the portion of the catheter that enters the patient's vein, and a second chamber for accommodating and maintaining the catheter. The device described therein does not accommodate for the insertion angle of the catheter.

U.S. Pat. No. 9,486,613 to Dickert describes a catheter securement device that has a flexible base member and a single piece elastomeric anchoring member mounted to an adhesive side of the base member. The anchoring member has a pair of opposing pull tabs that may be pulled to open a slit of the anchoring member for receiving a catheter hub therein. The anchoring member includes a third tab that is insertable into the slit for securing the catheter hub between the anchoring member and the base member. The catheter securement device described therein does not accommodate for the insertion angle of the catheter.

U.S. 2009/0149814 to Bailey describes a stabilization and support for a catheter that provides stress distribution for loads otherwise imposed on the patient's skin causing damage and sores. The support includes a mount sized to support a catheter extending substantially tangentially to the surface of the patient's skin, thus permitting stabilization of the catheter without exposing the skin to the sharp, highly stressful edges of catheter equipment. The support described therein is a one-sided ramp which may be prone to kinking of the catheter at the top of the support.

U.S. Pat. No. 9,895,514 to Bierman describes a securement system that supports and secures a catheter to the patient's skin. The support system is composed of a base and multiple inclined surfaces extending tangentially upwards to interface with a catheter connector of varying diameter which can be used in conjunction with adhesive to prevent dislodging of the catheter. The support described therein is a one-sided series of ramps which may be prone to kinking of the catheter at the top of the support. The system described therein also does not allow for repositioning of the system in the event that hemostatic intervention is required.

U.S. 2022/0062592 to Bonaguidi describes a medical device stabilization system for securing a device to a patient, relative to the angle and point of insertion thereby reducing stress at the insertion site, discomfort for the patient, and the risk of insertion site bleeding, while minimizing risk of damage to the medical device.

In view of the foregoing, it would be desirable to provide a device for reliably and releasably securing an intraluminal medical device to a patient at an optimal angle of insertion to thereby reduce patient discomfort, mitigate adverse bleeding events, and protect both the instrument or device, as well as the patient.

SUMMARY

Provided herein are improved devices and methods for securing a medical device, e.g., a catheter, to a patient, relative to the angle and point of insertion, thereby reducing stress at the insertion site and discomfort for the patient while minimizing risk of damage to the medical device. The stabilizer for securing a medical device to a patient may comprise a first top surface pivotally coupled to and extending from a first end of a bottom surface of the stabilizer at a first angle to an apex of the stabilizer, and a second top surface pivotally coupled to the first top surface and extending from the apex of the stabilizer towards a second end of the bottom surface at a second angle. The stabilizer may be configured to be affixed to a skin of the patient such that the first top surface is adjacent to an insertion site of the patient. The second angle may be configured to be selectively adjusted to thereby modify the first angle to an angle corresponding with an insertion angle of the medical device at the insertion site, and the medical device may extend from the insertion site along the first top surface over the apex and along the second top surface toward the patient to thereby reduce stress at the insertion site, reduce risk of insertion site bleeding, and secure the medical device to the patient.

The first top surface may be pivotally coupled to the first end of the bottom surface via a first living hinge, and the first top surface may be pivotally coupled to the second top surface via a second living hinge. In addition, the bottom surface may include a track comprising a first plurality of fixed stop cutouts, and a bottom edge of the second top surface may include a first pin configured to selectively engage the track at discrete positions within the first plurality of fixed stop cutouts to thereby selectively adjust the second angle. The track may be deformable to expand the first plurality of fixed stop cutouts and permit the first pin to move between the discrete positions within the first plurality of fixed stop cutouts. The stabilizer further may comprise a support strut pivotally coupled to an inner surface of the first top surface and extending toward the bottom surface, and the bottom edge of the support strut may comprise a second pin configured to selectively engage the track at discrete positions within a second plurality of fixed stop cutouts. The second plurality of fixed stop cutouts may be proximal to the first plurality of fixed stop cutouts. Additionally, the support strut may comprise one or more cutouts extending inward from one or both lateral sides of the support strut, the one or more cutouts sized and shaped to receive sutures therein. The support strut may be pivotally coupled to the inner surface of the first top surface via a living hinge.

Moreover, the stabilizer may comprise a channel extending at least partially along the first and/or second top surfaces between the first and second ends, the channel sized and shaped to receive the medical device therein. In some embodiments, the channel may be discontinuous between the first and second ends. In addition, the channel may be defined at least partially by a first slitted groove, the first slitted groove sized and shaped to receive a first medical device having an outer diameter within a first predetermined range therein. For example, the first slitted groove may be disposed along a centerline of a groove of the channel, the groove configured guide the medical device towards the first slitted groove. Additionally, the first slitted groove may be disposed on at least an upper edge of the second top surface. The first slitted groove may comprise a first opening having a width that is less than a diameter of the first slitted groove when the stabilizer is in a relaxed state and, when the stabilizer is transitioned to a flexed state, the width of the first opening of the first slitted groove may be greater than or equal to the diameter of the first slitted groove to thereby permit the first medical device to pass therethrough. Accordingly, when the first medical device is disposed within the first slitted groove and the stabilizer is in the relaxed state, the first medical device may be releasably secured within the first slitted groove. The stabilizer may be biased towards the relaxed state. In addition, the stabilizer may be configured to transition from the relaxed state to the flexed state upon application of force to the stabilizer.

In some embodiments, the channel may comprise a second slitted groove disposed within the first slitted groove. The second slitted groove may be sized and shaped to receive a second medical device having an outer diameter within a second predetermined range therein, and the second predetermined range may be different from the first predetermined range. For example, the second predetermined range may be less than the first predetermined range. The second slitted groove may comprise a second opening having a width that is less than a diameter of the second slitted groove when the stabilizer is in the relaxed state and, when the stabilizer is transitioned to the flexed state, the width of the second opening of the second slitted groove may be greater than or equal to the diameter of the second slitted groove to thereby permit the second medical device to pass therethrough.

The bottom surface may comprise a plurality of paddle extensions configured to facilitate over-taping thereof to secure the stabilizer to the patient's skin. Additionally, or alternatively, the bottom surface may comprise an adhesive layer configured to affix the stabilizer to the patient's skin. The stabilizer further may comprise one or more side scallop cutouts disposed on one or more lateral sides of the bottom surface and on one or more lateral sides of the first and/or second top surfaces, the one or more side scallop cutouts configured to facilitate over-taping thereof to secure the stabilizer to the patient's skin. For example, the one or more side scallop cutouts disposed on the one or more lateral sides of the bottom surface may be aligned with the one or more side scallop cutouts disposed on the one or more lateral sides of the first and/or second top surfaces.

In addition, the stabilizer further may comprise one or more extensions disposed on the first and/or second top surfaces, the one or more extensions configured to facilitate securement of the medical device to the stabilizer. For example, the one or more extensions may comprise one or more pairs of extensions extending upwardly from the first and/or second top surfaces, the one or more pairs of extensions comprising a cutout configured to receive a fastener therethrough to thereby secure the medical device to the stabilizer. Additionally, or alternatively, the one or more extensions may comprise one or more pairs of flexible extensions, each pair of flexible extensions configured to interlock with each other to secure the medical device to the stabilizer. For example, each pair of flexible extensions may be configured to selectively interlock with each other in discrete configurations to thereby secure various sized medical devices to the stabilizer.

Additionally, or alternatively, the one or more extensions may comprise one or more stretchable and flexible extensions, the one or more stretchable and flexible extensions comprising a linear array of protrusions configured to selectively engage with a corresponding slit disposed on the first and/or second top surfaces in discrete configurations to thereby secure various sized medical devices to the stabilizer. Moreover, the one or more stretchable and flexible extensions may be coupled to the first and/or second top surfaces via a base comprising a plurality of grill slots configured to facilitate flexure and conformance of the one or more stretchable and flexible extensions around the medical device. In addition, the stabilizer further may comprise one or more through holes disposed on the first and/or second top surfaces, the one or more through holes sized and shaped to receive a fastener therethrough.

DETAILED DESCRIPTION

Devices and methods are provided for securing a medical device, e.g., a catheter, to a patient, relative to the angle and point of insertion thereby reducing stress at the insertion site and discomfort for the patient while minimizing risk of damage to the medical device. The stabilizers described herein may be removably affixed to the patient's skin to secure and stabilize the extracorporeal portion of a medical device to the patient, such that various medical devices coupled thereto may be easily repositioned. For example, the stabilizers may be used to secure devices including a ventricular support catheter (e.g., Impella® made available by Abiomed, Danvers, Massachusetts), an intra-aortic balloon pump, an extracorporeal membrane oxygenation (ECMO) machine, a device for catheter-assisted thrombolysis (e.g., Ekos® made available by EKOS Corporation, Bothell, Washington), a temperature control therapy device (e.g., InnerCool™ made available by Zoll Medical, Chelmsford, Massachusetts), a cardiopulmonary support catheter, a catheter-directed thrombolysis system, a pulmonary artery catheter (also known as a Swan-Ganz catheter), or a temporary pacing catheter. In addition, the stabilizers may be used in conjunction with percutaneous suture-mediated closure devices (e.g., Perclose ProGlide™ made available by Abbott Laboratories, Chicago, Illinois), as described in further detail below.

Figure 1A:
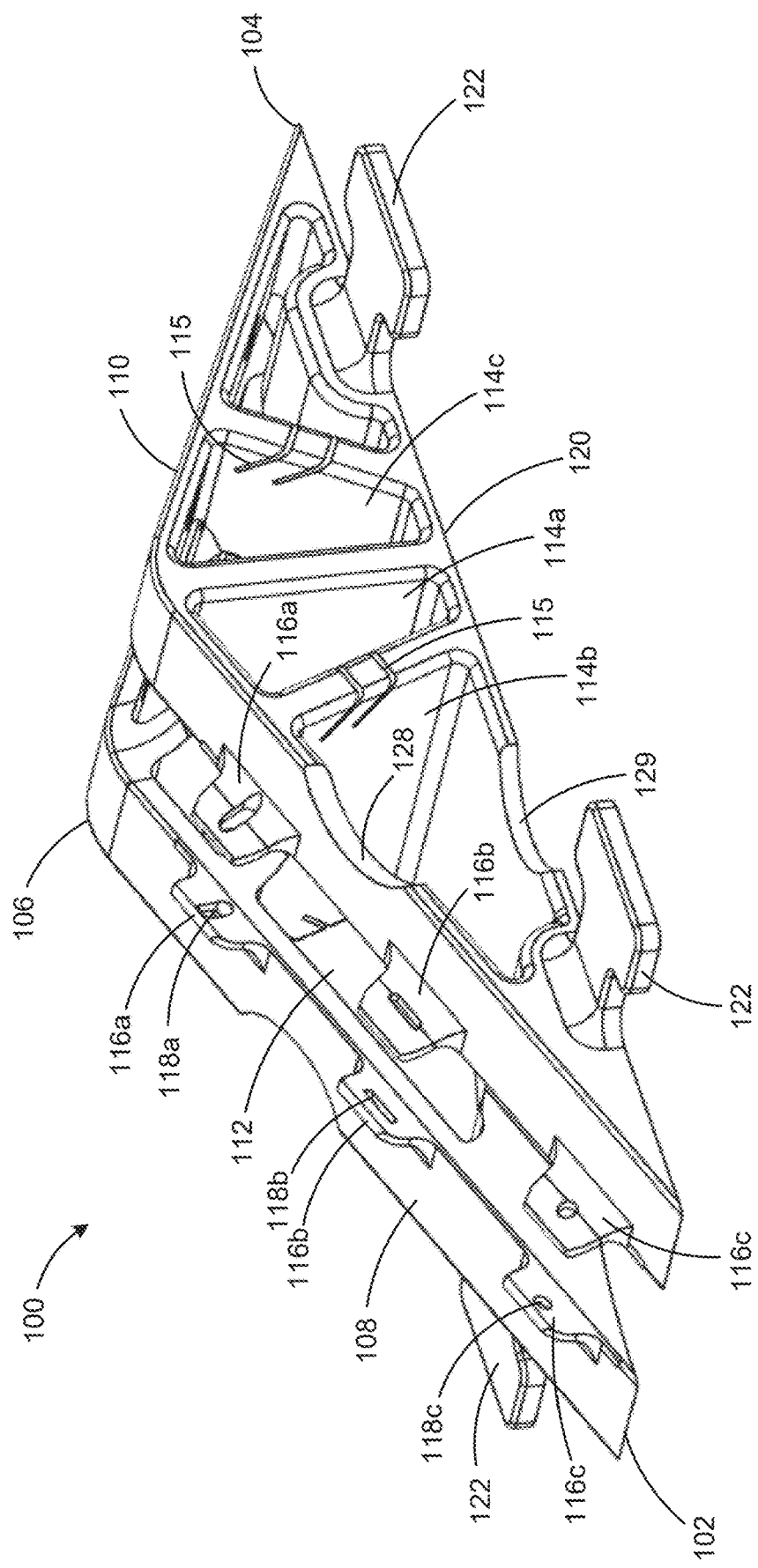
FIGS. 1A to 1E illustrate an exemplary medical device stabilizer constructed in accordance with some embodiments.
Figure 1B:
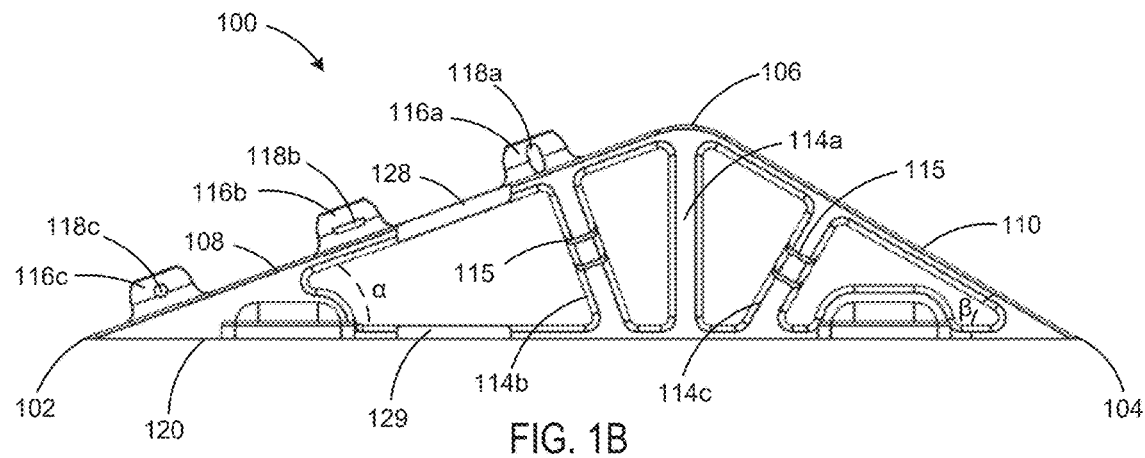
Figure 1C:
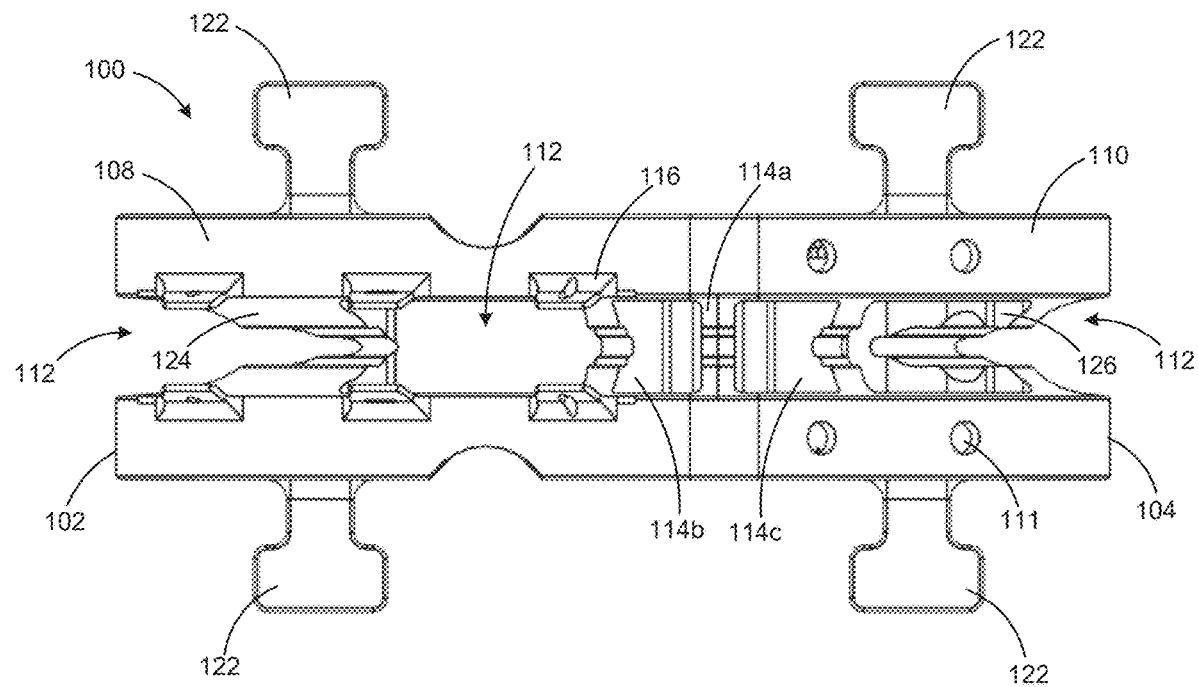

Referring now to FIGS. 1A to 1G, an exemplary medical device stabilizer pad, e.g., stabilizer 100, is provided. Stabilizer 100 may be formed of a relatively soft, conformable material, e.g., a material having a Shore A durometer between 10 A to 70 A, such that stabilizer 100 may conform to and/or bend to the contour of the patient's skin to thereby ensure long-term compliance to the patient's body. For example, stabilizer 100 may be formed of a closed cell foam, thermoplastic, rubber, silicone rubber, polyurethane, or other elastomeric or plastic material. Stabilizer 100 may be sized to be affixed to the patient's skin adjacent the insertion site of a medical device entering into the patient's body, and has a geometry that permits the medical device entering the patient's body to extend from the insertion site at an angle corresponding to its insertion angle along a first surface of the stabilizer to thereby prevent stress at the insertion site, as well as unwanted bleeding. Stabilizer 100 also may have a geometry that permits the medical device to follow the stabilizer back toward the patient's body along a second surface that prevents damage, e.g. kinking, of the device. For example, as shown in FIGS. 1A to 1C, stabilizer 100 may have first proximal end 102, second distal end 104, apex 106, first top surface 108 extending between first proximal end 102 and apex 106, second top surface 110 extending between apex 106 and second distal end 104, and bottom surface 120 extending between first proximal end 102 and second distal end 104. Accordingly, stabilizer 100 may have a triangular profile.

As shown in FIG. 1B, first top surface 108 may extend from first proximal end 102 at a first predetermined angle $\alpha$ relative to bottom surface 120, e.g., 10 to 40 degrees, preferably 20 degrees, such that angle $\alpha$ of first top surface 108 corresponds with the medical device's insertion angle, which may vary depending on the device used and the insertion site. First top surface 108 meets with second top surface 110 at apex 106, and second top surface 110 extends from apex 106 back toward second distal end 104 such that second top surface 110 extends from second distal end 104 at a predetermined angle R relative to bottom surface 120, e.g., 10 to 40 degrees, preferably 30 degrees, selected to position the medical device back toward the patient's body without causing a severe change in angle which can damage the device. Depending on the medical device type and its insertion angle into the patient, distal end 104 of stabilizer 100 may be positioned adjacent to the insertion site such that the medical device extends from the insertion site along second top surface 110 over apex 106 and back towards the patient's body along first top surface 108.

Bottom surface 120 may be affixed directly to the patient's skin. For example, bottom surface 120 may include an adhesive, e.g., an adhesive layer, that may be used to adhere stabilizer 110 directly to the patient's skin. The adhesive layer may be a two-sided adhesive tape selected to adhere to a patient's skin, such as 3M™ medical silicone tape with polyurethane film backing (made available by 3M, Maplewood, Minnesota). For example, one side of the adhesive layer may be fixed to bottom surface 120, and the other adhesive side of the adhesive layer may have a temporary peel-off layer disposed thereon. Accordingly, the temporary peel-off layer may be removed from the adhesive layer when the stabilizer is ready to be affixed to the patient. Bottom surface 120 may have a generally rectangular shape, and may be sized and shaped to be affixed to various parts of the patient's body, and to accommodate particular anatomy and constraints in consideration of the underlying tissues. For example, when sized to be affixed to the patient's anterior quadriceps, bottom surface 120 may have a width of one to five inches, preferably one to three inches, and a length of four to nine inches, preferably four to six inches.

In addition, bottom surface 120 further may include a plurality of paddles, e.g., extensions 122, extending therefrom to further facilitate securement of stabilizer 100 to the patient's skin. Extensions 122 may be sized and shaped to facilitate over-taping thereof, e.g., via surgical tape, to thereby secure extensions 122, and accordingly, stabilizer 100, to the patient's skin. For example, extensions 122 may have a T-shape. Accordingly, the footprint of bottom surface 120, including extensions 122, may define a plurality of cutout features configured to increase flexibility of stabilizer 100, such that stabilizer 100 may more easily contour and maximize contact with unique patient anatomy. As will be understood by a person of ordinary skill in the art, the dimensions and geometry of bottom surface 120, as well as the placement and number of extensions 122 may be selected to comfortably adhere to the patient's body in the desired location adjacent to the device insertion site. Moreover, in some embodiments, bottom surface 120 need not include an adhesive layer such that stabilizer 100 may be affixed to the patient's skin solely via over-taping of extensions 122.

Alternatively, in some embodiments, stabilizer 100 may be affixed to the patient's skin via a base that may be removably affixed to the patient's skin and removably coupled to bottom surface 120, as described in U.S. 2022/0062592 to Bonaguidi, the entire contents of which is incorporated herein by reference. For example, the bottom patient-contacting side of the base may be affixed to the patient's skin using methods known in the art, e.g., adhesion via a biocompatible adhesive layer. The adhesive layer may be a double-sided adhesive layer such that one side of the adhesive layer may be fixed to the bottom side of the base, and the other adhesive side of the adhesive layer may have a temporary peel-off layer disposed thereon. Moreover, the top stabilizer-contacting side of the base may include a first mating surface, for example reclosable fasteners, e.g., reclosable loops (e.g., Velcro® made available by Velcro Industries N.V., United Kingdom), and bottom surface 120 may be partially or entirely covered with a second mating surface, for example, reclosable fasteners, e.g., hooks, such that bottom surface 120 may removably mate with the first mating surface of the top side of the base. As will be understood by a person of ordinary skill in the art, the second mating surface may comprise reclosable loops if the first mating surface comprises reclosable hooks. Moreover, the entire surface of the top side of the base may be covered with the first mating surface to provide ample space for stabilizer 100 to mate with the base, and so that stabilizer 100 may easily be repositioned until it is in a desired location and/or orientation with respect to the medical device insertion site. Accordingly, the base may have a larger surface area than bottom surface 120. In addition, the base may include an opening sized and shaped to receive various sized devices depending on the underlying procedure to thereby facilitate alignment of the base, and accordingly, the stabilizer with the insertion site.

Figure 1D:
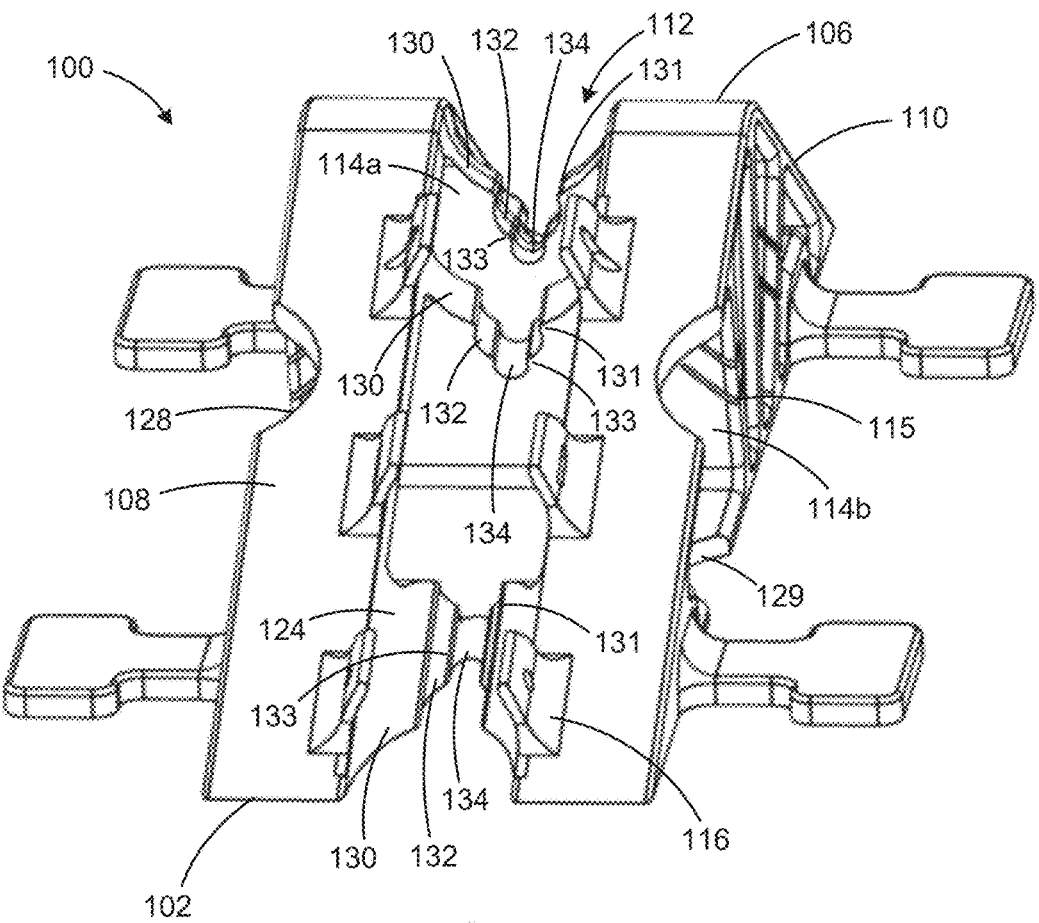
Figure 1E:
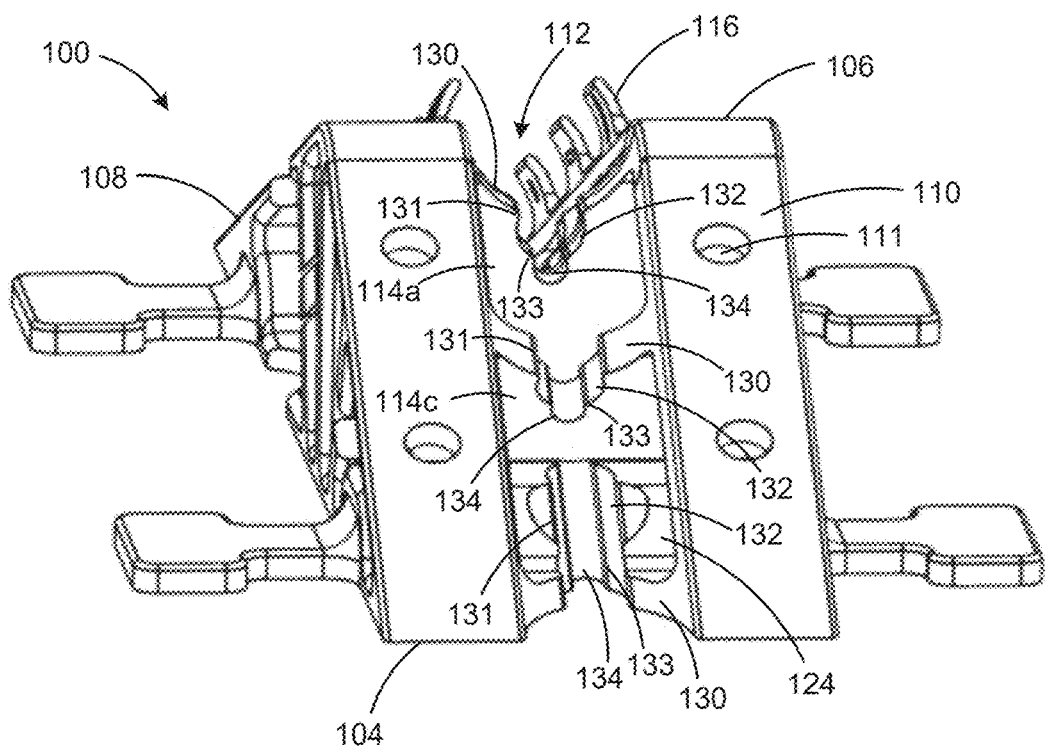

As shown in FIGS. 1C to 1E, stabilizer 100 further may include channel 112 extending at least partially along first top surface 108 and second top surface 110 between first end 102 and second end 104, and sized and shaped to accommodate the medical device therein to thereby stabilize the medical device with respect to stabilizer 100. For example, channel 112 may have a concave shape to facilitate positioning of the medical device therein such that the medical device may rest at the bottom of the concave geometry of channel 112. The degree of the concavity of channel 112 may be selected based on the size of the device used. Moreover, channel 112 at apex 106 may have a radius of curvature selected to prevent stress at the inflection point of the medical device as it extends from first top surface 108 to second top surface 110. In some embodiments, apex 106 may be positioned at a height of, e.g., one inch from bottom surface 120. As will be understood by a person of ordinary skill in the art, the dimensions of stabilizer 100 described herein will depend on the medical device being used and the underlying procedure as well as the anatomical region that the stabilizer is affixed thereto.

As shown in FIGS. 1C to 1E, channel 112 may be discontinuous in that channel 112 may be defined by a plurality of support structures, e.g., support struts 114a, 114b, 114c, and supports 124, 126, configured to support first top surface 108 and second top surface 110. As shown in FIG. 1B, first support strut 114a may extend between the upper surface of bottom surface 120 and the inner surface of apex 106 to thereby provide support to apex 106, second support strut 114b may extend between the upper surface of bottom surface 120, e.g., proximal to first support strut 114a, and the inner surface of first top surface 108 to thereby provide support to first top surface 108, and third support strut 114c may extend between the upper surface of bottom surface 120, e.g., distal to first support strut 114a, and the inner surface of second top surface 110 to thereby provide support to second top surface 110. Preferably, first support strut 114a may extend perpendicularly upward from bottom surface 120 towards apex 106, second support strut 114b may extend upward from bottom surface 120 at an angle relative to bottom surface 120 towards first top surface 108 such that second support strut 114b is perpendicular to first top surface 108, and third support strut 114c may extend upward from bottom surface 120 at an angle relative to bottom surface 120 towards second top surface 110 such that third support strut 114c is perpendicular to second top surface 110. As will be understood by a person having ordinary skill in the art, while three support struts are illustrated in FIGS. 1A to 1C, the stabilizer may include less or more than three support struts.

As shown in FIG. 1A, at least second support strut 114b and third support strut 114c may include one or more cutouts 115 extending at least partially inward from one or both lateral sides of the respective support strut. Cutouts 115 are sized and shaped to receive sutures therein, e.g., for passing sutures therein used to further secure the medical device to stabilizer 100. Preferably, cutouts 115 may extend inward from the lateral side of the respective support strut at upward angle relative to bottom surface 120 to thereby facilitate securement of the sutures therein when the sutures are fastened to stabilizer 100. As shown in FIG. 1B, the plurality of support structures may define cavities therebetween that extend at least partially through stabilizer 100, e.g., between the lateral sides of stabilizer 100. For example, the cavities may extend completely through stabilizer 100 and may be sized and shaped to provide a passage, e.g., placement/lacing path, for materials used for securing the device to stabilizer 100, e.g., surgical tape and/or sutures. Accordingly, the plurality of support structures may have a resulting ramp web thickness that is compatible with surgical staples or sutures.

In accordance with one aspect, stabilizer 100 may be used in conjunction with a percutaneous suture-mediated closure device such as the Perclose ProGlide™ vascular closure device (made available by Abbott Laboratories, Chicago, Illinois). A percutaneous suture-mediated closure device delivers a single suture to close a puncture site, e.g., a catheter insertion site, in large vessels such as the femoral vein or artery, following catheterization procedures. Depending on the interventional procedure, more than one percutaneous suture-mediated closure device may be used. Accordingly, as the free ends of the one or more sutures are exposed external to the patient, the sutures may be passed through any of the cutout features described herein to temporarily secure the sutures until the procedure is complete so that the sutures may be used to close the puncture site.

Figure 1F:
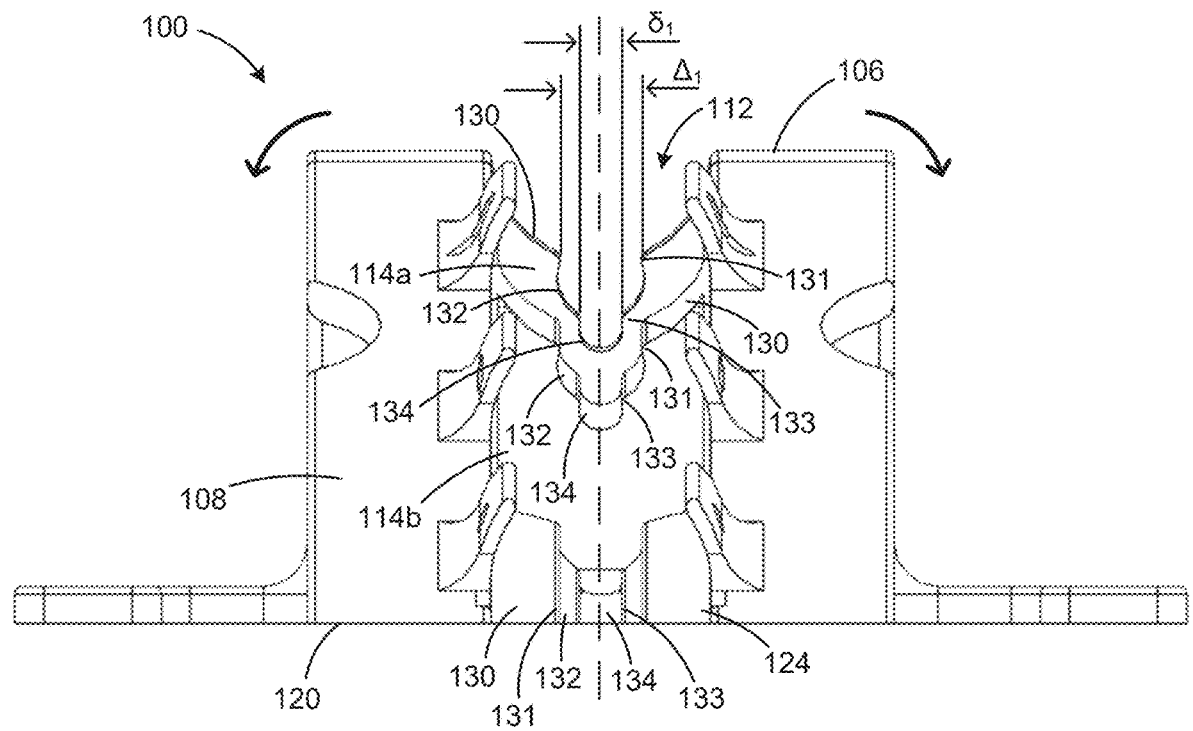
FIGS. 1F and 1G illustrate flexure of the medical device stabilizer of FIG. 1A.

As shown in FIG. 1C, stabilizer 100 further may include proximal support 124 coupled to first top surface 108 and at least partially defining channel 112, and distal support 126 coupled to second top surface 110 and at least partially defining channel 112. For example, as shown in FIGS. 1D and 1E, each of the plurality of support structures, e.g., support struts 114a, 114b, 114c, and supports 124, 126, may at least partially define the concave bottom surface of channel 112. For example, the upper surface of each of the plurality of support structures may each include groove 130, preferably disposed along the centerline of the respective support structure and having a concave surface. Groove 130 may have a degree of concavity selected to facilitate insertion of the medical device into first slitted groove 132, which may be disposed along the centerline of groove 130 and sized and shaped to releasably secure a medical device having a first outer diameter therein. In some embodiments, groove 130 alternatively may include a planar surface for guiding insertion of the medical device into first slitted groove 132. First slitted groove 132 may have a diameter that is less than the width of groove 130, and that is close to/only slightly larger than the first outer diameter of the medical device to be inserted therein, such that the medical device may be securely disposed within first slitted groove 132. Moreover, first slitted groove 132 defines opening 131 along the lower surface of groove 130, such that the medical device may be inserted into first slitted groove 132 via opening 131. As shown in FIG. 1F, in its relaxed state, opening 131 may have a width (e.g., width $\Delta_1$) that is less than the diameter of first slitted groove 132 to thereby secure the medical device within first slitted groove 132.

In addition, each of the plurality of support structures further may include second slitted groove 134 disposed along the centerline of first slitted groove 132 and sized and shaped to releasably secure a medical device having a second smaller outer diameter therein. Accordingly, first slitted groove 132 may accommodate a larger medical device than second slitted groove 134. Second slitted groove 134 may have a diameter that is less than the diameter of first slitted groove 132, and that is close to/only slightly larger than the second outer diameter of the medical device to be inserted therein, such that the medical device may be securely disposed within second slitted groove 134. Moreover, second slitted groove 134 defines opening 133 along the lower surface of first slitted groove 132, such that the medical device may be inserted into second slitted groove 134 via opening 134. As shown in FIG. 1F, in its relaxed state, opening 133 may have a width (e.g., width $\delta_1$) that is less than the diameter of second slitted groove 134 to thereby secure the medical device within second slitted groove 134. As will be understood by a person having ordinary skill in the art, the stabilizers described herein may include only one slitted groove that is sized and shaped to accommodate medical devices having an outer diameter within a first predetermined range. Alternatively, the stabilizers described herein may include more than two slitted grooves, each sized and shaped to accommodate different sized medical devices in the manner described above with regard to first slitted groove 132 and second slitted groove 134.

Figure 1G:
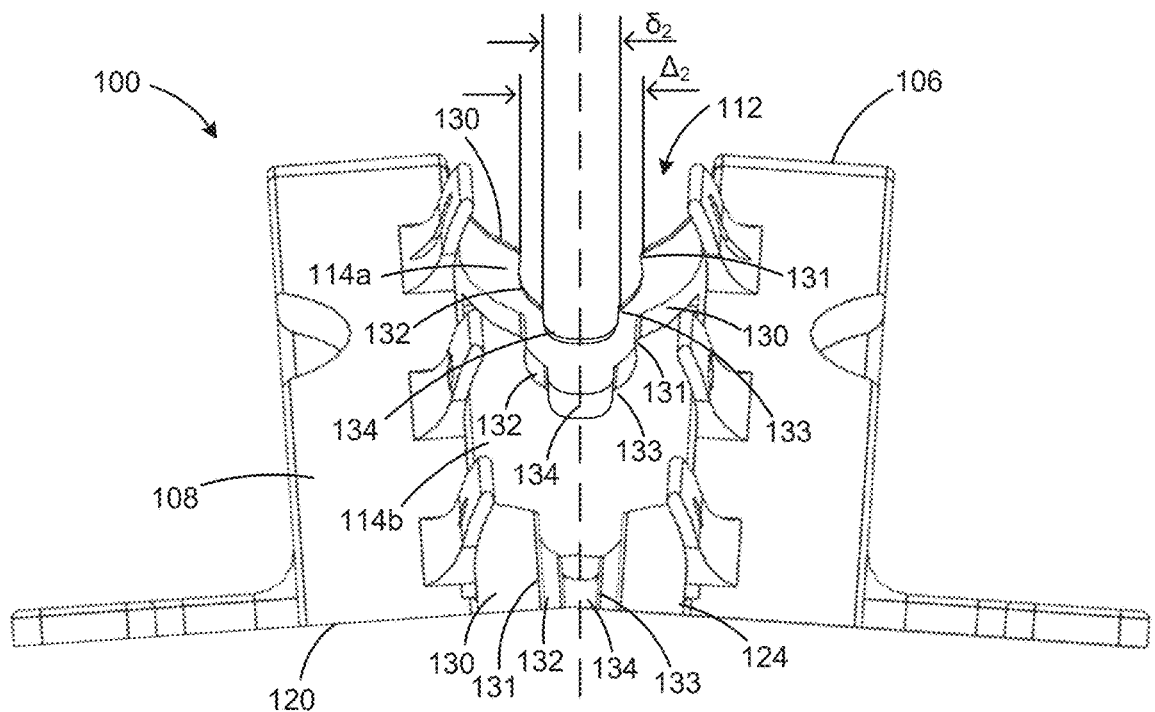

As shown in FIGS. 1F and 1G, stabilizer 100 may be deformable between the relaxed state and a flexed state to permit insertion/removal of the desired medical device into/from the corresponding slitted groove. Accordingly, first slitted grooves 132 and second slitted grooves 134 of each respective support structure may together function as a living hinge, and stabilizer 100 may have sufficient flexibility such that application of force to stabilizer 100, e.g., in the direction of the arrows shown in FIG. 1F, may enlarge the width of openings 131 (e.g., from width $\Delta_1$ width $\Delta_2$) to facilitate insertion of a medical device through openings 131 and into first slitted grooves 132, as well as the width of openings 133 (e.g., from width $\delta_1$ width $\delta_2$) to facilitate, if applicable, insertion of a medical device through openings 133 and into second slitted grooves 134. Upon release of the force, stabilizer 100 will return to its undeformed, relaxed state with the width of openings 131 being less than the diameter of first slitted grooves 132 and the width of openings 133 being less than the diameter of second slitted grooves 134, to thereby secure the selected medical device within the corresponding slitted groove. The medical device may be released from the respective slitted groove by similarly applying force to transition stabilizer 100 to the flexed state. In some embodiments, the stabilizers described herein may include a unitary support structure coupled to first top surface 108 and second top surface 110 to thereby define a continuous channel having groove 130, first slitted groove 132, and second slitted groove 134 that extends at least partially along first top surface 108 and second top surface 110 and across apex 106 between proximal end 102 and distal end 104.

Referring again to FIG. 1A, stabilizer 100 further may include a plurality of medical device securement elements configured to enhance the grip and securement of the medical device to stabilizer 100, e.g., via a fastener such as sutures and/or zip ties. As shown in FIG. 1A, the securement elements may comprise one or more pairs of extensions, e.g., extensions 116a, 116b, 116c, that are disposed on and extend outwardly from at least first top surface 108 of stabilizer 100, e.g., adjacent to channel 112, each extension having a through hole, e.g., cutouts 118a, 118b, 118c, sized and shaped to receive the fastener therethrough. For example, each pair of extensions may be disposed on opposite sides of channel 112. As shown in FIG. 1B, each type of extensions 116a, 116b, 116c may include a unique through hole, e.g., cutouts 118a, 118b, 118c, having a unique shape for receiving the fastener therethrough. For example, extensions 116a may include cutout 118a having a long oval shape extending away from first top surface 108, extensions 116b may include cutout 118b having a wide oval shape extending parallel to first top surface 108, and extensions 116c may include cutout 118c having a circle shape. FIGS. 1A to 1G illustrate stabilizer 100 as having one of each type of extensions 116a, 116b, 116c primarily to illustrate the different types of extensions; however, stabilizer 100 preferably includes a single type of extension, e.g., extensions 116a, 116b, or 116c, selected at least partially based on the type of medical device to be secured via stabilizer 100 and/or the type of fastener to be used with the extensions. In some embodiments, stabilizer 100 may include a combination of extension types selected from extensions 116a, 116b, 116c. Moreover, while FIGS. 1A to 1G illustrate stabilizer 100 having the plurality of extensions only on first top surface 108, as will be understood by a person having ordinary skill in the art, stabilizer 100 may additionally, or alternatively, include one or more pairs of extensions on second top surface 110 for enhancing the grip and securement of the medical device to second top surface 110.

In addition, as shown in FIG. 1A, stabilizer 100 further may include one or more side scallop cutout features, e.g., scallop cutouts 128 disposed on the lateral edges of first top surface 108 and/or scallop cutouts 129 disposed on the lateral edges of bottom surface 120, to facilitate securement of stabilizer 100 to the patient, e.g., via over-taping with adhesive surgical tapes and/or dressings. Accordingly, scallop cutouts 128 and scallop cutouts 129 may be aligned to facilitate over-taping of stabilizer 100. While FIGS. 1A to 1G illustrate stabilizer 100 having the scallop cutout features only on bottom surface 120 and first top surface 108, as will be understood by a person having ordinary skill in the art, stabilizer 100 may additionally, or alternatively, include scallop cutout features on the lateral edges of second top surface 110, and corresponding, aligned scallop cutout features on the lateral edges of bottom surface 120. Moreover, as shown in FIG. 1C, stabilizer 100 further may include one or more through holes, e.g., cutouts 111, disposed along at least second top surface 110, and sized and shaped for passing a fastener, e.g., sutures and/or zip ties, therethrough to further secure the medical device to stabilizer 100. For example, cutouts 111 may have a circular shape. While FIGS. 1A to 1G illustrate stabilizer 100 having cutouts 111 only on second top surface 110, as will be understood by a person having ordinary skill in the art, stabilizer 100 may additionally, or alternatively, include cutouts 111 on first top surface 108.

Figure 2A:
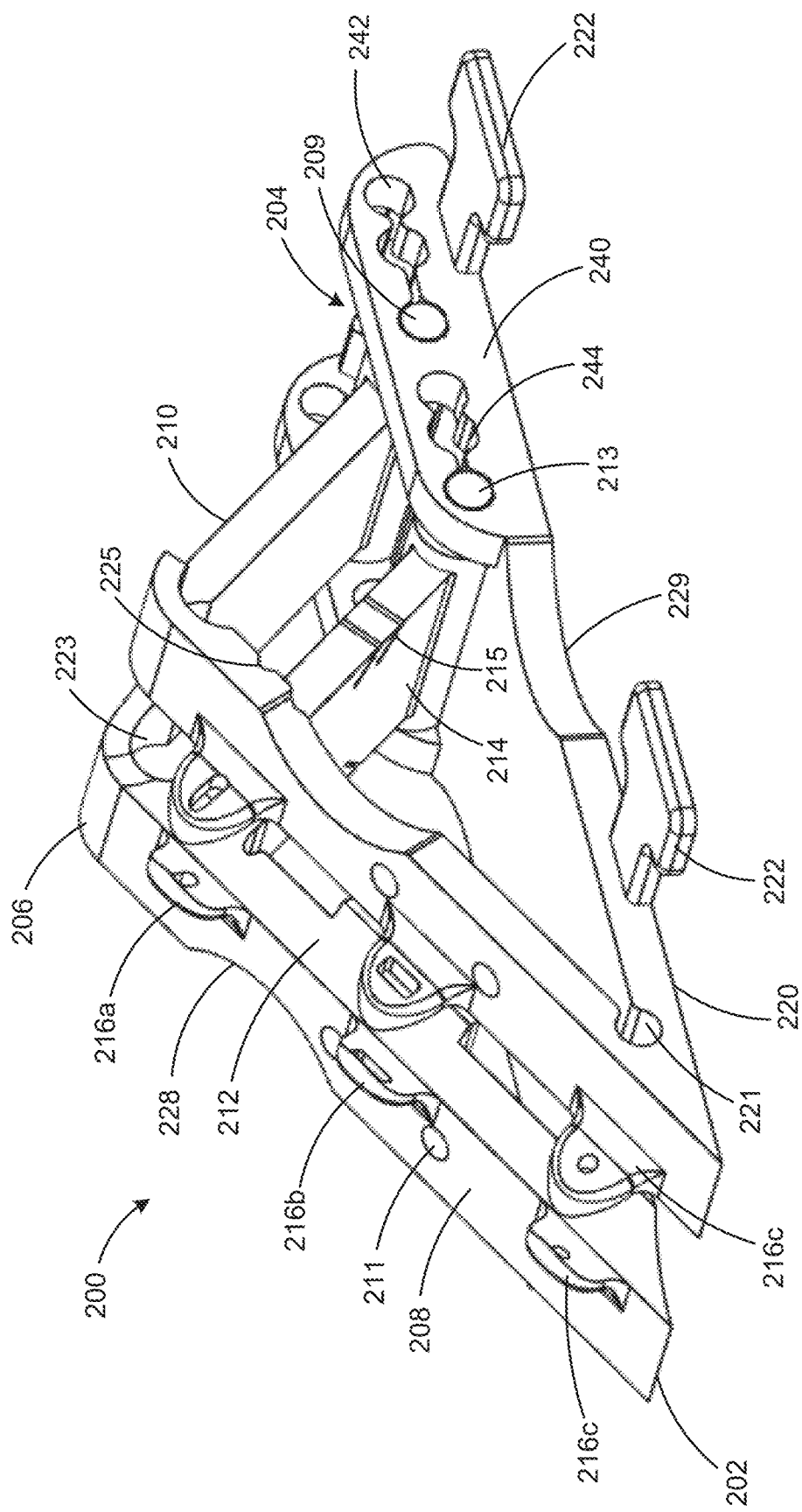
FIGS. 2A to 2C illustrate an exemplary medical device stabilizer having an adjustable medical device insertion angle constructed in accordance with some embodiments.
Figure 2B:
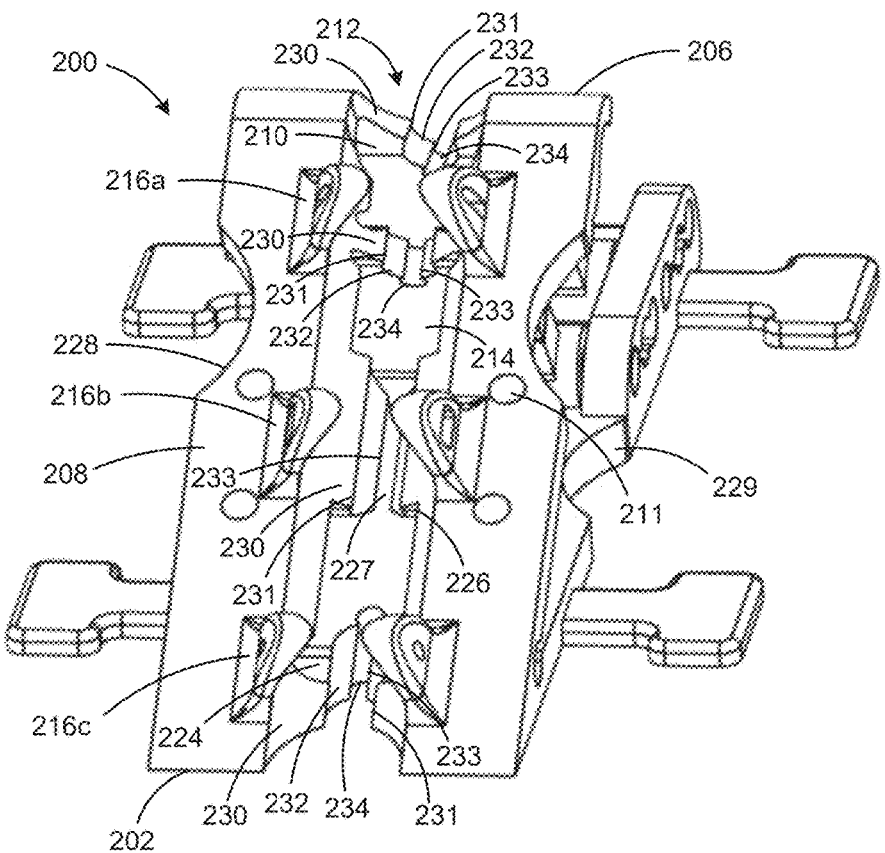
Figure 2C:
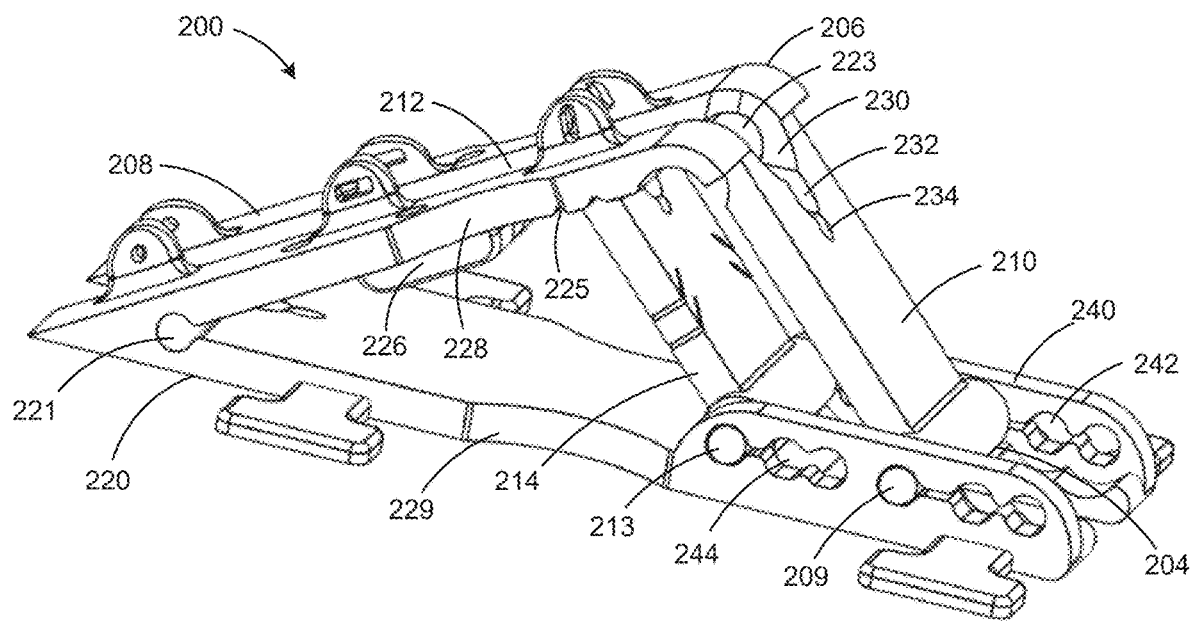

Referring now to FIGS. 2A to 2E, an exemplary medical device stabilizer having an adjustable medical device insertion angle is provided. Like stabilizer 100, stabilizer 200 may be formed of a conformable material, may be removably affixed to the patient's skin to secure and stabilize the extracorporeal portion of a medical device to the patient, and has a geometry that permits the medical device entering the patient's body to extend from the insertion site at an angle corresponding to its insertion angle along a first surface of the stabilizer to thereby prevent stress at the insertion site, as well as unwanted bleeding, and further permits the medical device to follow the stabilizer back toward the patient's body along a second surface that prevents damage, e.g. kinking, of the device. For example, as shown in FIGS. 2A to 2C, stabilizer 200 may have first proximal end 202, second distal end 204, apex 206, first top surface 208 extending between first proximal end 202 and apex 206, second top surface 210 extending between apex 206 and second distal end 204, channel 212 extending at least partially along first top surface 208 and second top surface 210 across apex 206 between first end 202 and second end 204, and bottom surface 220 extending between first proximal end 202 and second distal end 204 and having a plurality of extensions 222 extending therefrom to further facilitate securement of stabilizer 200 to the patient's skin.

Moreover, like stabilizer 100, stabilizer 200 may include a plurality of medical device securement elements, e.g., one or more pairs of extensions selected from extensions 216a having cutouts 218a, extensions 216b having cutouts 218b, and extensions 216c having cutouts 218c, for enhancing the grip and securement of the medical device to stabilizer 200, one or more scallop cutout features, e.g., scallop cutouts 228 and/or scallop cutouts 229, to facilitate securement of stabilizer 200 to the patient, and/or one or more through holes, e.g., cutouts 211, for further securing the medical device to stabilizer 200. While FIGS. 2A to 2E illustrate stabilizer 200 as having one of each type of extensions 216a, 216b, 216c, stabilizer 200 preferably includes a single type of extension, e.g., extensions 216a, 216b, or 216c, selected at least partially based on the type of medical device to be secured via stabilizer 100 and/or the type of fastener to be used with the extensions. In some embodiments, stabilizer 200 may include a combination of extension types selected from extensions 216a, 216b, 216c. Moreover, while FIGS. 2A to 2E illustrate stabilizer 200 having the plurality of extensions only on first top surface 208, as will be understood by a person having ordinary skill in the art, stabilizer 200 may additionally, or alternatively, include one or more pairs of extensions on second top surface 210 for enhancing the grip and securement of the medical device to second top surface 210. Additionally, while FIGS. 2A to 2C illustrate stabilizer 200 having the scallop cutout features only on bottom surface 220 and first top surface 208 and having cutouts 211 only on first top surface 208, as will be understood by a person having ordinary skill in the art, stabilizer 200 may additionally, or alternatively, include scallop cutout features on the lateral edges of second top surface 210, and corresponding, aligned scallop cutout features on the lateral edges of bottom surface 220, and may additionally, or alternatively, include cutouts 211 on second top surface 210.

Stabilizer 200 differs stabilizer 100 in that the angle between bottom surface 220 and second top surface 210, and accordingly, the angle between bottom surface 220 and first top surface 208, may be adjusted based on the insertion angle of medical device entering the patient's body. For example, the angle between bottom surface 220 and first top surface 208 may be adjusted to correspond with the medical device's insertion angle to permit the medical device entering the patient's body to extend from the insertion site, e.g., along first top surface 208, at an angle corresponding to its insertion angle to thereby prevent stress at the insertion site, as well as unwanted bleeding. As shown in FIG. 2A, the distal region of bottom surface 220 may include parallel tracks 240 extending upwardly from lateral edges of bottom surface 220 and having a plurality of distal fixed stop cutouts 242. For example, distal fixed stop cutouts 242 may include a plurality of cutouts disposed sequentially along a longitudinal length of tracks 240, each cutout sized and shaped to releasably, securely engage cylindrical pin 209 extending along the bottom edge of second top surface 210. As will be understood by a person having ordinary skill in the art, pin 209 may have a non-cylindrical shape and, accordingly, fixed stop cutouts 242 may have a corresponding geometry to secure pin 209 at discrete positions therein.

Tracks 240 may be sufficiently deformable to expand distal fixed stop cutouts 242 and permit pin 209 to be selectively positioned within the desired cutout of distal fixed stop cutouts 242. Moreover, as shown in FIG. 2A, bottom surface 220 may be joined with first top surface 208 via a first hinge, e.g., living hinge 221, such that the angle between bottom surface 220 and first top surface 208 may be adjustable, and first top surface 208 may be joined with second top surface 210 at apex 206 via a second hinge, e.g., living hinge 223, such that the angle between first top surface 208 and second top surface 210, and accordingly, the radius of curvature of apex 206, may be adjustable. Accordingly, the angle between second top surface 210 and bottom surface 220 may be selectively adjusted based on the position of pin 209 of second top surface 210 within distal fixed stop cutouts 242. Thus, by adjusting the angle between bottom surface 220 and second top surface 210, the angle between second top surface 210 and first top surface 208 (via second living hinge 223) as well as the angle between bottom surface 220 and first top surface 208 (via first living hinge 221) will be adjusted in a corresponding manner. Moreover, second distal end 204 of stabilizer 200 may be defined as the distalmost/lower edge of second top surface 210, e.g., at pin 209.

As shown in FIG. 2A, stabilizer 200 further may include adjustable support strut 214 pivotally coupled to the inner surface of first top surface 208 via a flexible joint, e.g., living hinges 225 disposed on both sides of support strut 214, and extending downward toward bottom surface 220. Like the support struts of stabilizer 100, support strut 214 may include one or more cutouts 215 extending at least partially inward from support strut 214 and sized and shaped to receive sutures therein, e.g., for passing sutures therein used to further secure the medical device to stabilizer 200. Moreover, parallel tracks 240 further may have a plurality of proximal fixed stop cutouts 244 disposed proximally to distal fixed stop cutouts 242 and including a plurality of cutouts disposed sequentially along a longitudinal length of tracks 240, each cutout sized and shaped to releasably, securely engage pin 213 extending along the bottom edge of support strut 214. Tracks 240 may be sufficiently deformable to expand proximal fixed stop cutouts 244 and permit pin 213 to be selectively positioned within the desired cutout of proximal fixed stop cutouts 242. Accordingly, the angle between support strut 214 and bottom surface 220 may be selectively adjusted based on the position of pin 213 of support strut 214 within proximal fixed stop cutouts 244. Thus, by adjusting the angle between bottom surface 220 and support strut 214, the angle between support strut 214 and first top surface 208 (via living hinges 225) as well as the angle between bottom surface 220 and first top surface 208 (via first living hinge 221) will be adjusted in a corresponding manner.

Figure 2D:
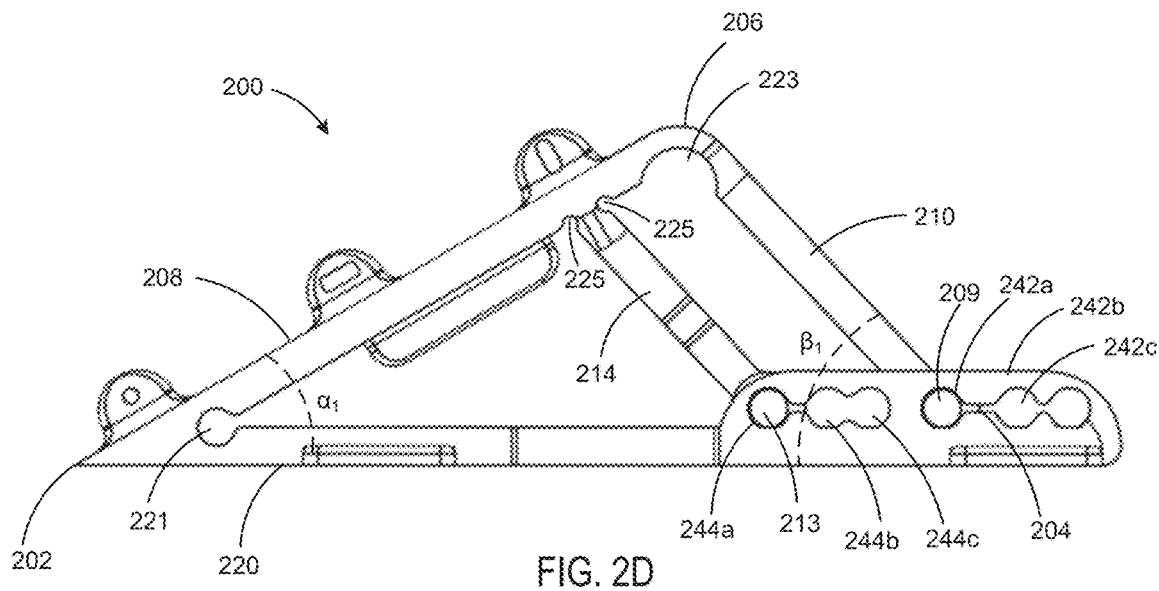
FIGS. 2D and 2E illustrate adjustment of the medical device insertion angle of the medical device stabilizer of FIG. 2A.
Figure 2E:
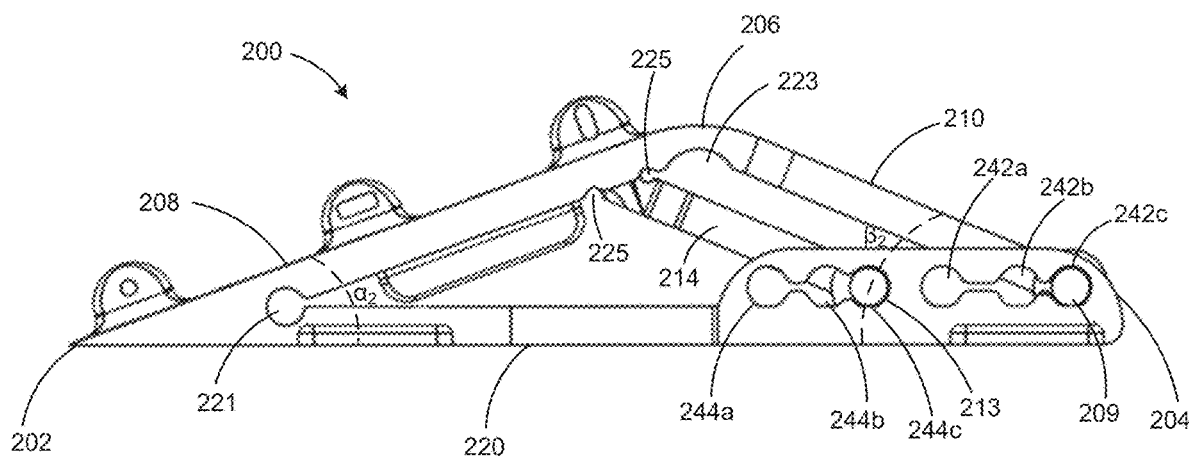

During operation of stabilizer 200, support strut 214 may remain parallel with second top surface 210, such that the angle between support strut 214 and bottom surface 220 remains equal to the angle between second top surface 210 and bottom surface 220. For example, FIG. 2D illustrates stabilizer in a first configuration where pin 209 of second top surface 210 in a first position, e.g., within cutout 242a of distal fixed stop cutouts 242, and pin 213 of support strut 214 in a first position, e.g., within cutout 244a of proximal fixed stop cutouts 244, such that the angle between support strut 214 and bottom surface 220 and the angle between second top surface 210 and bottom surface 220 is $\beta_1$, and the angle between first top surface 208 and bottom surface 220 is $\alpha_1$. FIG. 2E illustrates stabilizer in a second configuration where pin 209 of second top surface 210 in a second position, e.g., within cutout 242c of distal fixed stop cutouts 242, and pin 213 of support strut 214 in a second position, e.g., within cutout 244c of proximal fixed stop cutouts 244, such that the angle between support strut 214 and bottom surface 220 and the angle between second top surface 210 and bottom surface 220 is $\beta_2$, and the angle between first top surface 208 and bottom surface 220 is $\alpha_2$, where $\alpha_2$ is less than $\alpha_1$ and $\beta_2$ is less than $\beta_1$. For example, the discrete positions of pin 209 along distal fixed stop cutouts 242 and pin 213 along proximal fixed stop cutouts 244 may be such that the angle between first top surface 208 and bottom surface 220 is adjustable between 10 to 40 degrees, e.g., 20 degrees, 25 degrees, and 30 degrees. While FIGS. 2D and 2E illustrate distal fixed stop cutouts 242 and proximal fixed stop cutouts 244 each having three discrete fixed stops, as will be understood by a person having ordinary skill in the art, distal fixed stop cutouts 242 and proximal fixed stop cutouts 244 may include less or more than three discrete fixed stops.

Moreover, like stabilizer 100, stabilizer 200 may be deformable between a relaxed state and a flexed state to permit insertion/removal of the desired medical device into/from a corresponding slitted groove within channel 212. For example, referring again to FIGS. 2B and 2C, stabilizer 200 further may include first support 224 coupled to first top surface 208 and at least partially defining channel 212, and second support 224 coupled to first top surface 208 distal to first support 224 and at least partially defining channel 212. Each of the plurality of support structures, e.g., support strut 214 and first and second supports 224, 226, as well as second top surface 210 may at least partially define the concave bottom surface of channel 212. For example, the upper surface of each of the plurality of support structures and second top surface 210 may each include groove 230, preferably disposed along the centerline of the respective support structure and second top surface, first slitted groove 232 disposed along the centerline of groove 230 and having opening 231, and second slitted groove 234 disposed along the centerline of first slitted groove 232 and having opening 233, such that first slitted groove 232 and second slitted groove 234 together function as a living hinge to permit transitioning of stabilizer 200 between the relaxed state and the flexed state to thereby releasably and securely receive the desired medical device within first slitted groove 232 or second slitted groove 234. In some embodiments, channel 212 defined by the upper edge of second top surface 210 may have a radius of curvature that is less than a radius of curvature of apex 206.

As shown in FIG. 2B, instead of second slitted groove 234, support 226 may instead include slit 227 defined by opening 233 and extending along the entire length of first slitted groove 232 such that the surface defining second slitted groove 234 is discontinuous, thereby enhancing flexibility of stabilizer 200. In some embodiments, the upper surface of second top surface 210 also may include one or more grooves and/or slitted grooves for releasably securing the medical device therein, such that the medical device passes through the slitted groove at the upper edge of second top surface and through a slitted groove along upper surface of second top surface 210 back towards the patient's body. As will be understood by a person having ordinary skill in the art, the other support structures described herein, e.g., supports 124, 126, 224, may similarly include a slit.

Figure 3:
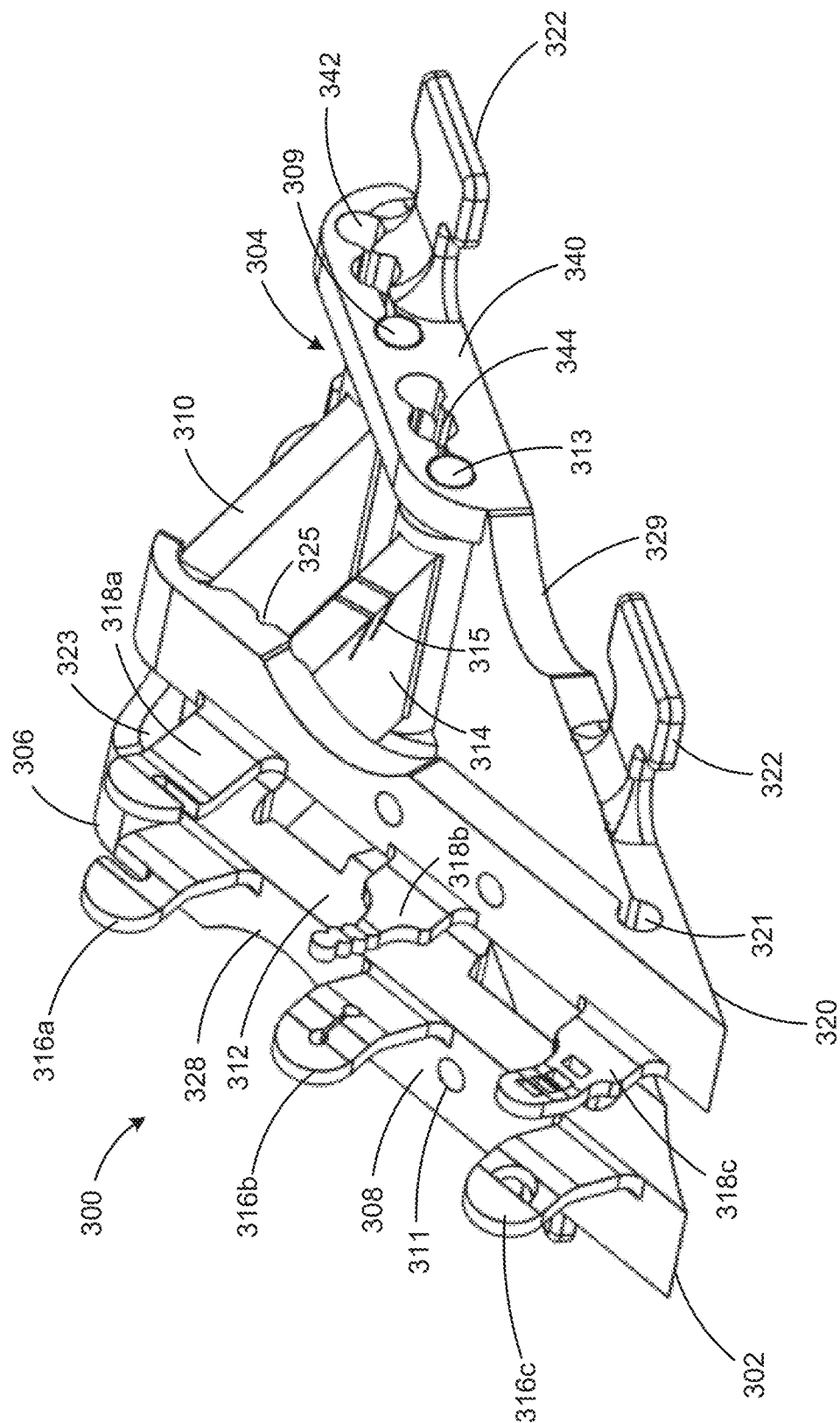
FIG. 3 illustrates an alternative exemplary medical device stabilizer having multiple designs of interlocking securement members and an adjustable medical device insertion angle constructed in accordance with some embodiments.

Referring now to FIG. 3, another exemplary medical device stabilizer having an adjustable medical device insertion angle is provided. Stabilizer 300 may be constructed similar to stabilizer 200. For example, first proximal end 302, second distal end 304, apex 306, first top surface 308, second top surface 310 coupled to first top surface 308 via living hinge 323 and having pin 309, channel 312, bottom surface 320 coupled to first top surface 308 via living hinge 321 and comprising plurality of extensions 322 and tracks 340 having plurality of distal cutouts 342 and plurality of distal cutouts 344, support strut 314 coupled to first top surface 308 via living hinges 325 and having pin 313, through hole cutouts 311, support strut cutouts 315, and scallop cutouts 328, 329 correspond with first proximal end 202, second distal end 204, apex 206, first top surface 208, second top surface 210 coupled to first top surface 208 via living hinge 223 and having pin 209, channel 212, bottom surface 220 coupled to first top surface 208 via living hinge 221 and comprising plurality of extensions 222 and tracks 240 having plurality of distal cutouts 242 and plurality of distal cutouts 244, support strut 214 coupled to first top surface 208 via living hinges 225 and having pin 213, through hole cutouts 211, support strut cutouts 215, and scallop cutouts 228, 229.

Stabilizer 300 differs from stabilizer 200 in that instead of a plurality of medical device securement elements selected from extensions 216a, 216b, 216c, stabilizer 300 may include a plurality of medical device securement elements selected from pairs of flexible and stretchable extensions 316a, 318a, flexible and stretchable extensions 316b, 318b, and flexible and stretchable extensions 316c, 318c, which may wrap around and capture the medical device within channel 312. Like extensions 216a, 216b, 216c, the pairs of flexible extensions of stabilizer 300 may be disposed on opposite sides of channel 312 for enhancing the grip and securement of the medical device. As shown in FIG. 3, each type of flexible extensions 316a, 316b, 316c may include a unique interlocking feature configured to releasably engage with a corresponding unique interlocking feature of corresponding flexible extensions 318a, 318b, 318c. For example, flexible extension 316a may have a laterally extending slit configured to interlock with a corresponding laterally extending slit of flexible extension 318a, flexible extension 316b may have a cutout sized and shaped to selectively receive a desired amount of flexible extension 318b and flexible extension 318b may include a linear array of protrusions for securing flexible extension 318b within the cutout of flexible extension 316b, and flexible extension 316c may have an opening sized and shaped to selectively receive a desired amount of flexible extension 318c and a nub sized and shaped to be received within one of a plurality of corresponding openings of flexible extension 318c to thereby secure flexible extension 318c to flexible extension 316c.

FIG. 3 illustrates stabilizer 300 as having one of each type of pairs of flexible extensions 316a, 318a, flexible extensions 316b, 318b, and flexible extensions 316c, 318c primarily to illustrate the different types of flexible extensions; however, stabilizer 300 preferably includes a single type of flexible extension, e.g., flexible extensions 316a, 318a, flexible extensions 316b, 318b, or flexible extensions 316c, 318c, selected at least partially based on the type of medical device to be secured via stabilizer 300. In some embodiments, stabilizer 300 may include a combination of extension types selected from pairs of flexible extensions 316a, 318a, flexible extensions 316b, 318b, and flexible extensions 316c, 318c. Moreover, while FIG. 3 illustrates stabilizer 300 having the plurality of extensions only on first top surface 308, as will be understood by a person having ordinary skill in the art, stabilizer 300 may additionally, or alternatively, include one or more pairs of extensions on second top surface 310 for enhancing the grip and securement of the medical device to second top surface 310.

Figure 4:
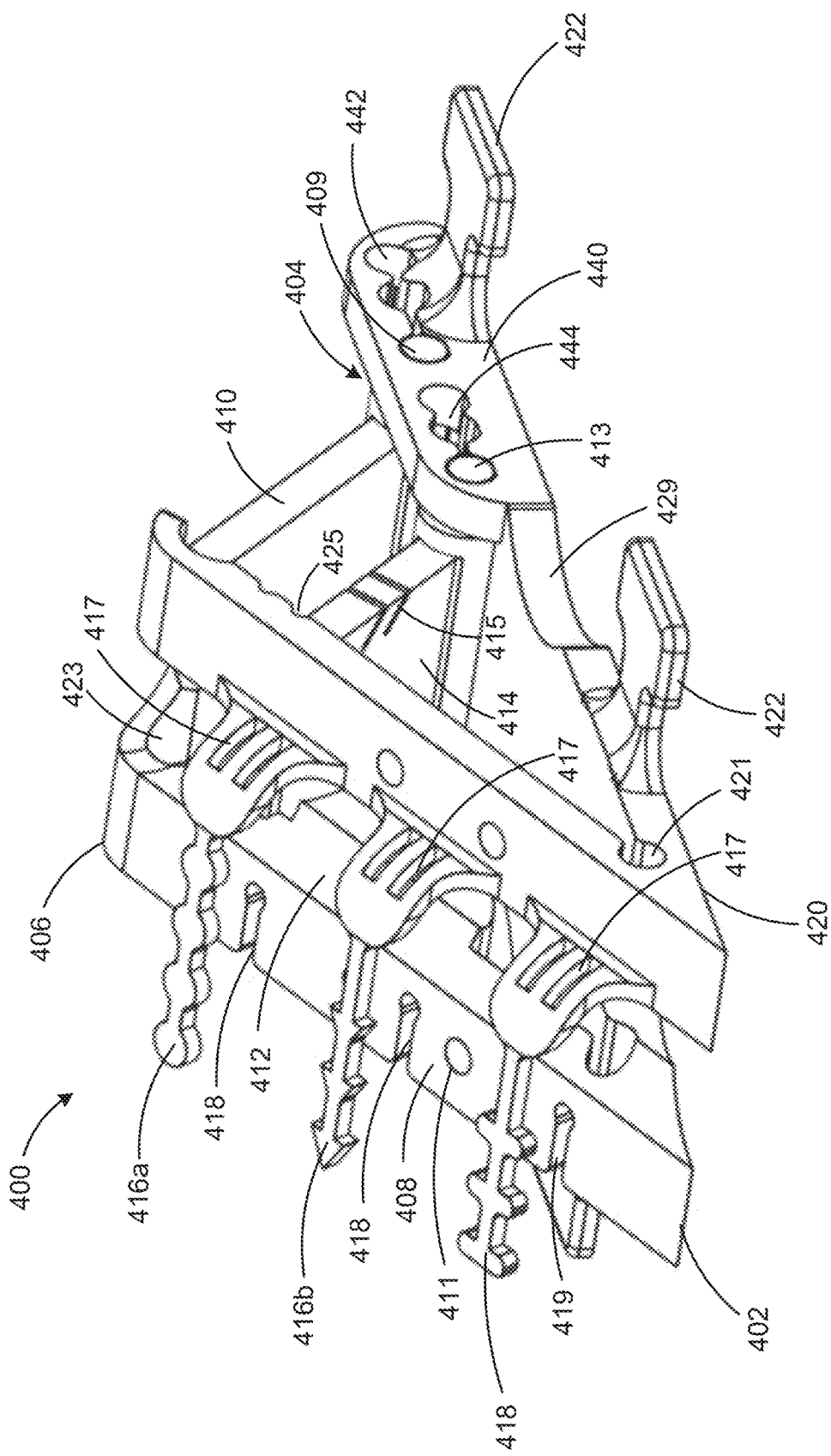
FIG. 4 illustrates another alternative exemplary medical device stabilizer having multiple designs of self-securement members and an adjustable medical device insertion angle constructed in accordance with some embodiments.

Referring now to FIG. 4, another exemplary medical device stabilizer having an adjustable medical device insertion angle is provided. Stabilizer 400 may be constructed similar to stabilizer 200. For example, first proximal end 402, second distal end 404, apex 406, first top surface 408, second top surface 410 coupled to first top surface 408 via living hinge 423 and having pin 409, channel 412, bottom surface 420 coupled to first top surface 408 via living hinge 421 and comprising plurality of extensions 422 and tracks 440 having plurality of distal cutouts 442 and plurality of distal cutouts 444, support strut 414 coupled to first top surface 408 via living hinges 425 and having pin 413, through hole cutouts 411, support strut cutouts 415, and scallop cutouts 428, 429 correspond with first proximal end 202, second distal end 204, apex 206, first top surface 208, second top surface 210 coupled to first top surface 208 via living hinge 223 and having pin 209, channel 212, bottom surface 220 coupled to first top surface 208 via living hinge 221 and comprising plurality of extensions 222 and tracks 240 having plurality of distal cutouts 242 and plurality of distal cutouts 244, support strut 214 coupled to first top surface 208 via living hinges 225 and having pin 213, through hole cutouts 211, support strut cutouts 215, and scallop cutouts 228, 229.

Stabilizer 400 differs from stabilizer 200 in that instead of a plurality of medical device securement elements selected from extensions 216a, 216b, 216c, stabilizer 400 may include a plurality of medical device securement elements selected from flexible and stretchable extensions 416a, 416b, 416c configured to wrap around and capture the medical device within channel 412. As shown in FIG. 4, stabilizer 400 may include a plurality of slits 418 extending inward from a lateral side of stabilizer 400 opposite channel 412 from flexible extensions 416a, 416b, 416c, each slit 418 sized and shaped to releasably and securely engage with flexible extensions 416a, 416b, 416c. Moreover, each of flexible extensions 416a, 416b, 416c may be connected to stabilizer 400 via a corresponding base having a plurality of grill slots 417 configured to facilitate the flexure and conformance of the respective flexible extension around any non-cylindrical feature of the medical device. As shown in FIG. 4, each type of flexible extensions 416a, 416b, 416c may include a unique linear array of protrusions configured to secure the respective flexible extension within the respective slit 418 with a desired length of the flexible extension passed through the respective slit. For example, flexible extension 416a may include a linear array of circular shaped protrusions, flexible extension 416b may include a linear array of triangular shaped, barb-like protrusions, and flexible extension 416c may include a linear array of rectangular shaped protrusions.

FIG. 4 illustrates stabilizer 400 as having one of each type of flexible extensions 416a, 416b, 416c primarily to illustrate the different types of flexible extensions; however, stabilizer 400 preferably includes a single type of flexible and stretchable extension, e.g., flexible and stretchable extensions 416a, 416b, or 416c, selected at least partially based on the type of medical device to be secured via stabilizer 300. In some embodiments, stabilizer 400 may include a combination of extension types selected from flexible and stretchable extensions 416a, 416b, 416c. Moreover, while FIG. 4 illustrates stabilizer 400 having the plurality of extensions only on first top surface 408, as will be understood by a person having ordinary skill in the art, stabilizer 400 may additionally, or alternatively, include one or more pairs of extensions on second top surface 410 for enhancing the grip and securement of the medical device to second top surface 410.

In some embodiments, any of the top surfaces of any of the stabilizers described herein may further include a suture pad comprising a skin-like material having a softness and toughness similar to that of human skin, such as those made available by Nasco Healthcare, Fort Atkinson, Wisconsin. For example, the suture pad may be formed of a material having a durometer between −10 A to 20 A, while having a sufficient thickness that may be sutured by a physician to thereby secure the medical device to the stabilizer. The suture pad may be secured to the stabilizer via an adhesive or melding process that secures the material to the less soft material of the stabilizer.

While various illustrative embodiments of the invention are described above, it will be apparent to one skilled in the art that various changes and modifications may be made therein without departing from the invention. For example, any of the stabilizers described herein may include any combination of the different types of medical device securement elements described above, e.g., stabilizer 100 may include one or more of any of flexible and stretchable extensions 316*a*, 318*a*, 316*b*, 318*b*, 316*c*, 318*c*, 416*a*, 416*b*, 416*c*. The appended claims are intended to cover all such changes and modifications that fall within the true scope of the invention.

What is claimed:

1. A medical device stabilizer system, the system comprising:
    a stabilizer comprising:
        a first top surface pivotally coupled to and extending from a first end of a bottom surface of the stabilizer at a first angle to an apex of the stabilizer;
        a second top surface pivotally coupled to the first top surface and extending from the apex of the stabilizer towards a second end of the bottom surface at a second angle, the stabilizer configured to be affixed to a skin of a patient such that the first top surface is adjacent to an insertion site of the patient; and
    a medical device extending along the first top surface over the apex and along the second top surface toward the bottom surface to thereby reduce stress at the insertion site, reduce risk of insertion site bleeding, and secure the medical device to the patient,
    wherein the first and second top surfaces are mutually configured to selectively adjust the second angle to thereby modify the first angle to an angle corresponding with an insertion angle of the medical device at the insertion site.

2. The stabilizer of claim 1, wherein the first top surface is pivotally coupled to the first end of the bottom surface via a first living hinge, and wherein the first top surface is pivotally coupled to the second top surface via a second living hinge.

3. The stabilizer of claim 1, wherein the movable coupling comprises:
    a track on the bottom surface, the track comprising a first plurality of fixed stop cutouts; and
    a first pin on a bottom edge of the second top surface, the pin configured to selectively engage the track at discrete positions within the first plurality of fixed stop cutouts to thereby selectively adjust the second angle.

4. The stabilizer of claim 3, wherein the track is deformable to expand the first plurality of fixed stop cutouts and permit the first pin to move between the discrete positions within the first plurality of fixed stop cutouts.

5. The stabilizer of claim 4, further comprising:
    a support strut pivotally coupled to an inner surface of the first top surface and extending toward the bottom surface, a bottom edge of the support strut comprising a second pin configured to selectively engage the track at discrete positions within a second plurality of fixed stop cutouts,
    wherein the second plurality of fixed stop cutouts is proximal to the first plurality of fixed stop cutouts.

6. The stabilizer of claim 5, wherein the support strut comprises one or more cutouts extending inward from one or both lateral sides of the support strut, the one or more cutouts sized and shaped to receive sutures therein.

7. The stabilizer of claim 5, wherein the support strut is pivotally coupled to the inner surface of the first top surface via a living hinge.

8. A stabilizer for securing a medical device to a patient, the stabilizer comprising:
    a bottom surface extending between first and second ends;
    a first top surface pivotally coupled to and extending from the bottom surface first end at a first angle to an apex of the stabilizer;
    a second top surface pivotally coupled to the first top surface and extending from the apex towards the bottom surface second end at a second angle, the bottom surface configured to be affixed to a skin of the patient such that the first top surface is adjacent to an insertion site of the patient; and
    a channel extending at least partially along the first and/or second top surfaces between the bottom surface first and second ends, the channel sized and shaped to receive the medical device therein,
    wherein the first and second top surfaces are mutually configured to selectively adjust the second angle to thereby modify the first angle to an angle corresponding with an insertion angle of the medical device at the insertion site.

9. The stabilizer of claim 8, wherein the channel is discontinuous between the bottom surface first and second ends.

10. The stabilizer of claim 8, wherein the channel is defined at least partially by a first slitted groove, the first slitted groove sized and shaped to receive a first medical device having an outer diameter within a first predetermined range therein.

11. The stabilizer of claim 10, wherein the first slitted groove is disposed along a centerline of a groove of the channel, the groove configured guide the medical device towards the first slitted groove.

12. The stabilizer of claim 10, wherein the first slitted groove is disposed on at least an upper edge of the second top surface.

13. The stabilizer of claim 10, wherein the first slitted groove comprises a first opening having a width that is less than a diameter of the first slitted groove when the stabilizer is in a relaxed state, and wherein, when the stabilizer is transitioned to a flexed state, the width of the first opening of the first slitted groove is greater than or equal to the diameter of the first slitted groove to thereby permit the first medical device to pass therethrough.

14. The stabilizer of claim 13, wherein, when the first medical device is disposed within the first slitted groove and the stabilizer is in the relaxed state, the first medical device is releasably secured within the first slitted groove.

15. The stabilizer of claim 13, wherein the stabilizer is biased towards the relaxed state.

16. The stabilizer of claim 13, wherein the stabilizer is configured to transition from the relaxed state to the flexed state upon application of force to the stabilizer.

17. The stabilizer of claim 13, wherein the channel comprises a second slitted groove disposed within the first slitted groove, the second slitted groove sized and shaped to receive a second medical device having an outer diameter within a second predetermined range therein, the second predetermined range different from the first predetermined range.

18. The stabilizer of claim 17, wherein the second slitted groove comprises a second opening having a width that is less than a diameter of the second slitted groove when the stabilizer is in the relaxed state, and wherein, when the stabilizer is transitioned to the flexed state, the width of the second opening of the second slitted groove is greater than or equal to the diameter of the second slitted groove to thereby permit the second medical device to pass therethrough.

19. The stabilizer of claim 17, wherein the second predetermined range is less than the first predetermined range.

20. The stabilizer of claim 8, wherein the bottom surface comprises a plurality of paddle extensions configured to facilitate over-taping thereof to secure the stabilizer to the patient's skin.

21. The stabilizer of claim 8, wherein the bottom surface comprises an adhesive layer configured to affix the stabilizer to the patient's skin.

22. The stabilizer of claim 8, further comprising one or more side scallop cutouts disposed on one or more lateral sides of the bottom surface and on one or more lateral sides of the first and/or second top surfaces, the one or more side scallop cutouts configured to facilitate over-taping thereof to secure the stabilizer to the patient's skin.

23. The stabilizer of claim 22, wherein the one or more side scallop cutouts disposed on the one or more lateral sides of the bottom surface are aligned with the one or more side scallop cutouts disposed on the one or more lateral sides of the first and/or second top surfaces.

24. The stabilizer of claim 8, further comprising one or more extensions disposed on the first and/or second top surfaces, the one or more extensions configured to facilitate securement of the medical device to the stabilizer.

25. The stabilizer of claim 24, wherein the one or more extensions comprise one or more pairs of extensions extending upwardly from the first and/or second top surfaces, the one or more pairs of extensions comprising a cutout configured to receive a fastener therethrough to thereby secure the medical device to the stabilizer.

26. The stabilizer of claim 24, wherein the one or more extensions comprise one or more pairs of flexible extensions, each pair of flexible extensions configured to interlock with each other to secure the medical device to the stabilizer.

27. The stabilizer of claim 26, wherein each pair of flexible extensions are configured to selectively interlock with each other in discrete configurations to thereby secure various sized medical devices to the stabilizer.

28. The stabilizer of claim 24, wherein the one or more extensions comprise one or more stretchable and flexible extensions, the one or more stretchable and flexible extensions comprising a linear array of protrusions configured to selectively engage with a corresponding slit disposed on the first and/or second top surfaces in discrete configurations to thereby secure various sized medical devices to the stabilizer.

29. The stabilizer of claim 28, wherein the one or more stretchable and flexible extensions are coupled to the first and/or second top surfaces via a base comprising a plurality of grill slots configured to facilitate flexure and conformance of the one or more stretchable and flexible extensions around the medical device.

30. The stabilizer of claim 8, further comprising one or more through holes disposed on the first and/or second top surfaces, the one or more through holes sized and shaped to receive a fastener therethrough.

31. A stabilizer for securing a medical device to a patient, the stabilizer comprising:
- a first top surface pivotally coupled to and extending from a first end of a bottom surface of the stabilizer at a first angle to an apex of the stabilizer; and
- a second top surface pivotally coupled to the first top surface and extending from the apex of the stabilizer towards a second end of the bottom surface at a second angle, the stabilizer configured to be affixed to a skin of the patient such that the first top surface is adjacent to an insertion site of the patient,
- wherein the first and second top surfaces are mutually configured to selectively adjust the second angle to thereby modify the first angle to an angle corresponding with an insertion angle of the medical device at the insertion site, and
- wherein the bottom surface and the second top surface together comprise a movable coupling which permits selective adjustment of the second angle.

\* \* \* \* \*